US012674504B2

(12) United States Patent
Cattoor et al.

(10) Patent No.: US 12,674,504 B2
(45) Date of Patent: Jul. 7, 2026

(54) ELECTRIC DRIVE AXLE WITH MULTI-SPEED GEARBOX

(71) Applicant: Dana Belgium N.V., Bruges (BE)

(72) Inventors: Kurt Cattoor, Koolkerke (BE); Filip D. Schacht, Meulebeke (BE); Filip Van Raepenbusch, Bruges (BE)

(73) Assignee: DANA BELGIUM, Bruges (BE)

( * ) Notice: Subject to any disclaimer, the term of this patent is extended or adjusted under 35 U.S.C. 154(b) by 389 days.

(21) Appl. No.: 18/321,618

(22) Filed: May 22, 2023

(65) Prior Publication Data

US 2023/0392672 A1      Dec. 7, 2023

Related U.S. Application Data

(60) Provisional application No. 63/365,993, filed on Jun. 7, 2022.

(51) Int. Cl.
| | |
|---|---|
| *B60K 1/00* | (2006.01) |
| *B60K 1/02* | (2006.01) |
| *B60K 17/08* | (2006.01) |
| *B60K 17/28* | (2006.01) |
| *F16H 3/091* | (2006.01) |
| *F16H 37/08* | (2006.01) |

(52) U.S. Cl.
CPC .............. *F16H 3/091* (2013.01); *B60K 1/00* (2013.01); *B60K 1/02* (2013.01); *B60K 17/08* (2013.01); *B60K 17/28* (2013.01); *F16H 37/0813* (2013.01); *B60K 2001/001* (2013.01); *F16H 2200/0021* (2013.01); *F16H 2200/0034* (2013.01)

(58) Field of Classification Search
CPC ....... F16H 3/091; F16H 37/0813; B60K 1/02; B60K 1/00; B60K 17/08; B60K 17/28; B60K 2001/001
USPC ......................................................... 180/65.6
See application file for complete search history.

(56) References Cited

U.S. PATENT DOCUMENTS

| | | | |
|---|---|---|---|
| 6,484,834 B2 | 11/2002 | Bowen et al. | |
| 7,140,267 B2 | 11/2006 | Haka | |
| 8,116,951 B2 * | 2/2012 | Holmes .................... | B60K 6/36 701/87 |
| 9,303,698 B2 | 4/2016 | Sugiyama et al. | |
| 9,744,841 B2 * | 8/2017 | Zhu .......................... | B60K 6/48 |
| 11,236,804 B2 * | 2/2022 | Engerman ............. | F16H 57/033 |
| 11,577,604 B2 * | 2/2023 | Engerman ................ | B60K 1/02 |
| 11,667,189 B1 * | 6/2023 | Engerman ............. | F16H 37/082 475/204 |

(Continued)

FOREIGN PATENT DOCUMENTS

| | | |
|---|---|---|
| CN | 111890904 A | 11/2020 |
| DE | 102016220511 A1 | 4/2018 |

(Continued)

*Primary Examiner* — Hau V Phan
(74) *Attorney, Agent, or Firm* — McCoy Russell LLP

(57) ABSTRACT

An electric axle and electric axle product line. The electric axle includes, in one example, a multi-speed gearbox assembly rotationally coupled to a first electric machine and including a first shaft with a first clutch positioned coaxial thereto and a second shaft with a second clutch positioned coaxial thereto. In the multi-speed gearbox assembly, the first clutch and the second clutch are parallel to one another and configured to alter the unit's operating gear ratio.

15 Claims, 11 Drawing Sheets

(56) References Cited

U.S. PATENT DOCUMENTS

| | | | | |
|---|---|---|---|---|
| 2004/0251064 A1* | 12/2004 | Imai | ...................... | B60W 20/30 |
| | | | | 180/65.23 |
| 2004/0251862 A1* | 12/2004 | Imai | ...................... | B60K 6/547 |
| | | | | 903/910 |
| 2005/0026736 A1 | 2/2005 | Bennett | | |
| 2014/0262675 A1* | 9/2014 | Sugiyama | ........... | F16H 57/0483 |
| | | | | 192/85.01 |
| 2016/0137045 A1* | 5/2016 | Zhu | ...................... | B60W 20/00 |
| | | | | 180/65.265 |
| 2016/0301576 A1* | 10/2016 | Didenko | ............. | H04L 65/1069 |
| 2017/0050514 A1 | 2/2017 | Li | | |
| 2018/0265062 A1* | 9/2018 | Bowers | .................. | B60T 7/042 |
| 2019/0301576 A1* | 10/2019 | Harada | ............... | F16H 37/0813 |
| 2019/0383373 A1* | 12/2019 | Engerman | ............. | F16H 37/082 |
| 2020/0325966 A1* | 10/2020 | Brammer | ................. | B60K 1/02 |
| 2021/0039487 A1* | 2/2021 | Engerman | .............. | F16D 25/10 |
| 2021/0362591 A1* | 11/2021 | Engerman | ............... | B60K 1/00 |
| 2021/0394601 A1* | 12/2021 | Führer | ............... | F16H 63/3425 |

FOREIGN PATENT DOCUMENTS

| | | | |
|---|---|---|---|
| EP | 2995488 A1 | 3/2016 | |
| EP | 3098103 A1 | 11/2016 | |

* cited by examiner

ELECTRIC DRIVE AXLE WITH MULTI-SPEED GEARBOX

CROSS REFERENCE TO RELATED APPLICATION

The present application claims priority to U.S. Provisional Application No. 63/365,993, entitled "ELECTRIC DRIVE AXLE WITH MULTI-SPEED GEARBOX," and filed on Jun. 7, 2022. The entire contents of the above-listed application are hereby incorporated by reference for all purposes.

TECHNICAL FIELD

The present disclosure relates to a modular electric drive axle with a multi-speed gearbox.

BACKGROUND AND SUMMARY

As the push toward vehicle electrification persists, electric axles have been used in a variety of vehicle platforms in an attempt to fulfill the electrification needs of different vehicle sectors. These electric axles include motors, geartrains, and differentials that form electric drive assemblies. When compared to electric drive units with motors, geartrains, and differentials spaced away from one another, certain electric axle configurations demand less alteration to the surrounding vehicle systems, which allows the resources devoted to vehicle powertrain development to be decreased to a certain degree, if desired.

U.S. Pat. No. 9,303,698 B2 to Sugiyama et al. teaches an electric drive system that includes an electric motor with a dual clutch arrangement that is directly attached to the motor's rotor shaft. The dual clutch arrangement is designed to shift between two gear reductions formed between the dual clutch shafts and a counter shaft. Further, in Sugiyama's system, a countershaft gear directly meshes with the differential's ring gear.

The inventors have recognized several drawbacks with Sugiyama's electric drive system as well as other previous electric drives. For instance, in Sugiyama's system, the double clutch arrangement is directly coupled to the motor's rotor shaft, which in some vehicle platforms may pose space constraints on surrounding vehicle components such as the vehicle's frame rails. Further, packaging the dual-clutch arrangement next to the rotor shaft, decreases the system's adaptability and increases the wear on the clutches due to the high rotational speeds of the clutches during system operation. Therefore, Sugiyama's electric drive system has constrained applicability with regard to different vehicle platforms and the clutches in the system may have decreased longevity. Further, other prior electric axles have been incompatible with previous internal combustion engine drivelines. Still further, certain vehicle platforms may demand increased gearbox drop.

The inventors have recognized the aforementioned challenges and developed an electric axle to at least partially overcome the challenges. The electric axle includes, in one example, a multi-speed gearbox assembly rotationally coupled to a first electric machine. The multi-speed gearbox assembly, in such an example, includes a first shaft with a first clutch positioned coaxial thereto and a second shaft with a second clutch positioned coaxial thereto. Further, in the gearbox assembly, the first clutch and the second clutch are configured to adjust a gear ratio of the multi-speed gearbox assembly and the first shaft and the second shaft are parallel to one another. In this way, the electric axle achieves increased compactness as well as adaptability.

In one example, the electric axle may further include an input unit that is removably coupled to the multi-speed gearbox assembly. The input unit includes a gear reduction that is rotationally coupled to the first electric machine and a gear in one of the two gear reductions that is fixedly coupled to the first shaft. Incorporating an input unit with a gear reduction into the electric axle, enables the drop of the electric axle to be varied to fit specific end-use design targets of the vehicle platform. For instance, in one use-case example the input unit may be designed with drop that suits a mining vehicle and in another use-case example the input unit may be designed with a drop that suits a material handling vehicle. Further, the use of the input unit allows the clutch speeds to be reduced thereby increasing clutch longevity.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A highly adaptable and modular electric axle system is described herein. The system's adaptability is achieved by designing the axle with modular units that are removably coupled to one another. These modular units may include a multi-speed gearbox and an input unit, in one example. The multi-speed gearbox achieves increased compactness and multispeed shifting functionality by placing one clutch on a first countershaft and a second clutch on a second countershaft and placing both clutches axially between the gear reductions. The input unit includes a gear reduction with a ratio that may be selected to reduce the delta speed in the gearbox clutches, thereby reducing drag losses. Designing the electric axle with the modular units provide greater design freedom with regard to gear ratio selection as well as packaging profile. Further, the use of the modular units in the electric axle allows the electric axle to be more efficiently incorporated into drivelines which were previously designed for use with internal combustion engines (e.g., diesel engines), if wanted. Consequently, the electric axle may be more efficiently manufactured, if so desired.

Figure 1:
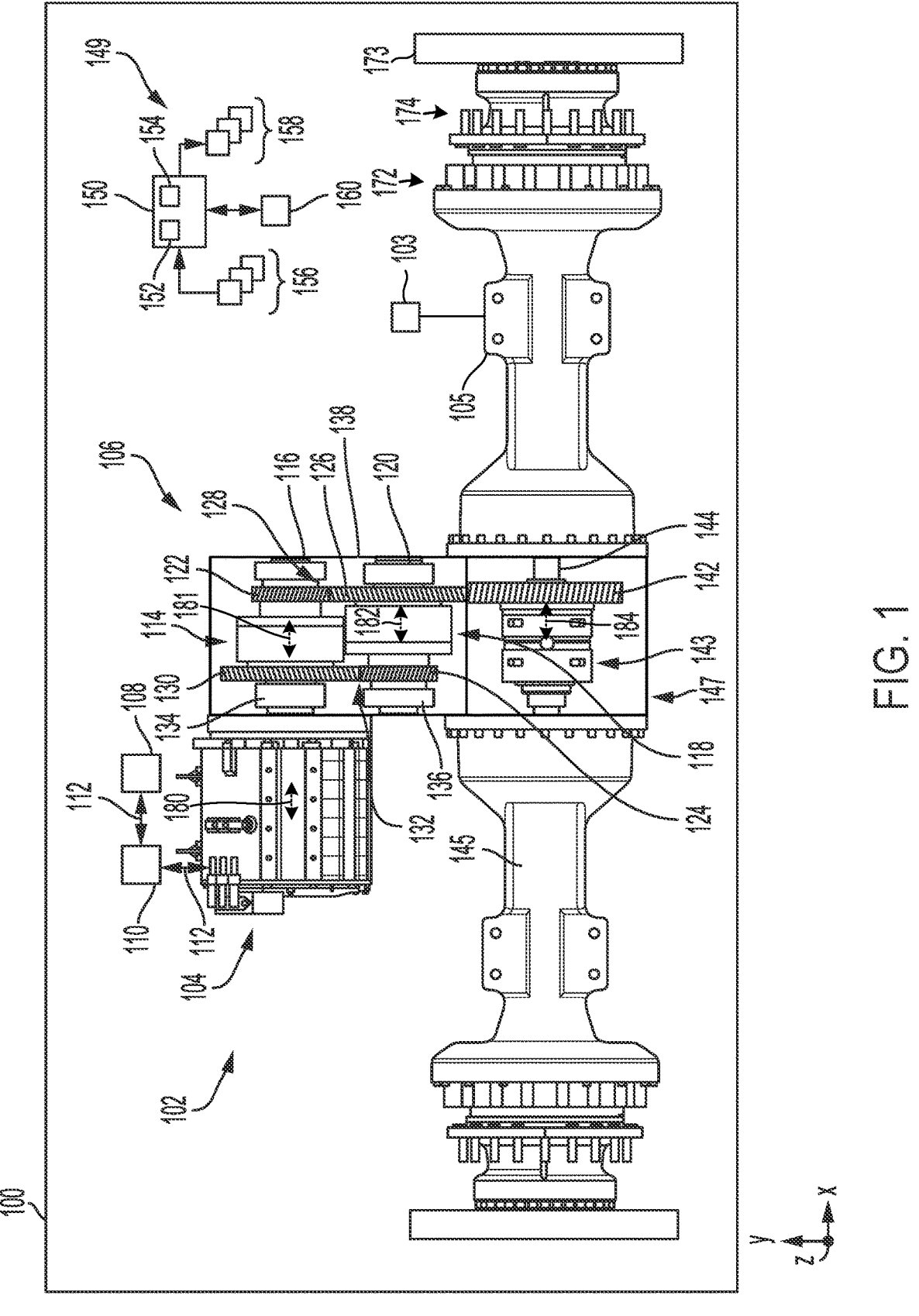
FIG. 1 is a top view of a first example of an electric axle in a vehicle.

FIG. 1 depicts an electric vehicle (EV) 100 with an electric axle 102 that generates motive power for vehicle propulsion. The EV 100 may be a light, medium, or heavy duty vehicle. Specifically, the vehicle may be a mining vehicle or a material handling vehicle, in different use-case examples. However, in other examples, the EV 100 may be a passenger vehicle such as a truck, sedan, wagon, and the like. Further, the EV 100 may be an all-electric vehicle, in one example, or a hybrid electric vehicle (HEV) that includes an internal combustion engine, in another example. In the all-electric vehicle example, the vehicle may include one or more electric axles while in the HEV example, the vehicle may include one electric axle and another axle which is driven by an engine or the engine may function to recharge the traction battery.

The electric axle 102 includes an electric machine 104 that is rotationally coupled to a multi-speed gearbox assembly 106 (e.g., a two-speed powershift transmission). The electric machine 104 and the other electric machines described herein may include components such as a rotor with a rotor shaft and a stator that electromagnetically interact during operation to generate motive power. Further in one example, the electric machine 104 may be a motor-generator which is designed to generate electrical energy during regeneration operation.

The electric axle 102 may specifically be an electric beam axle, in one example. In such an example, the electric beam axle may be coupled to a dependent suspension system 103 via mounts 105 which may specifically be coupled to dampers, struts, springs, combinations thereof and the like in the dependent suspension system. In such an example, electric axle may be an un-sprung weight. However, in other examples, the electric axle may not be a beam axle and the axle may be coupled to an independent suspension system. A beam axle is an axle with mechanical components which structurally support one another and extend between drive wheels. For instance, the beam axle may be a structurally continuous structure that spans the drive wheels on a lateral axis, in one embodiment. Thus, wheels coupled to the beam axle substantially move in unison when articulating, during, for example, vehicle travel on uneven road surfaces. To elaborate, in the beam axle example, the camber angle of the wheels may remain substantially constant as the suspension moves through its travel.

The electric machine 104 may be electrically coupled to one or more energy storage device(s) 108 (e.g., one or more traction batteries, capacitor(s), combinations thereof, and the like) by way of an inverter 110 when the machine is designed as alternating current (AC) machines. Arrows 112 denote the electrical connection between the electric machine 104, the inverter 110, and the energy storage device(s) 108. These inverters and the other inverters described herein are designed to convert direct current (DC) to AC and vice versa. In one use-case example, the electric machine 104 and the inverter 110 may be multi-phase devices (e.g., three, six, or nine phase devices) which can achieve greater efficiency when compared to other types of motors. The electric machine 104 may have a larger profile and lower operating speed range when compared to the other motors described herein. However, the motor may take on another form, in alternate embodiments. For instance, a DC motor may be used in the electric drive, in other examples.

The multi-speed gearbox assembly 106 includes a first clutch 114 that is positioned coaxial to a first shaft 116 (e.g., a first countershaft) and a second clutch 118 that is positioned coaxial to a second shaft 120 (e.g., a second countershaft). The first clutch 114 and the second clutch 118 may be friction clutches. A friction clutch, as described herein, may include two sets of plates (e.g., spacer plates and friction plates) designed to frictionally engage and disengage one another while the clutch is opened and closed. As such, the amount of torque transferred through the clutch may be modulated depending on the degree of plate engagement. As such, the friction clutches may include plates, drums, and the like the facilitate torque transfer modulation. To elaborate, the multi-speed gearbox assembly 106 is able to powershift between operating gear ratios where one clutch is engaged while the other clutch is disengaged to perform a torque hand-off. As such, the clutches may be slipped during a shifting transient to decrease torque interruptions in the powertrain.

The first clutch 114 is designed to selectively rotationally couple a gear 122 to the first shaft 116 such that they co-rotate, when the clutch is fully engaged. As such, the gear 122 may be idly mounted to the shaft 116 via a bearing. As such, when the first clutch 114 is disengaged, the gear 122 and the shaft 116 are allowed to independently rotate. Conversely, when the first clutch is engaged, the gear 122 and the shaft 116 co-rotate and transfer torque therebetween.

On the other hand, the second clutch 118 is designed to selectively rotationally couple a gear 124 to the second shaft 120. As such, the gear 124 may be idly mounted to the shaft 120 via a bearing. As such, when the second clutch 118 is disengaged, the gear 124 and the shaft 120 are allowed to independently rotate. Conversely, when the second clutch is engaged, the gear 124 and the shaft 120 co-rotate and transfer torque therebetween.

A gear as described herein is a component with teeth formed thereon that mesh with teeth of another gear. The teeth in the gears shown in FIG. 1 are helical. However, the gear teeth may have another suitable profile in alternate embodiments.

The gear 122 meshes with a gear 126 that is fixedly coupled to the second shaft 120. The gears 122 and 126 form a first gear reduction 128. The gear 124 meshes with a gear 130 that is fixedly coupled to the first shaft 116. The gears 124 and 130 form a second gear reduction 132. The first and second clutches 114 and 118 are therefore designed to shift between the two gear reductions to alter the gear ratio of the gearbox. The gear 130 may be fixedly coupled to the shaft 116 such that they co-rotate during gearbox operation. Likewise, the gear 126 may be fixedly coupled to the shaft 120 such that they co-rotate during gearbox operation. Conversely, the gears 122, 124 may be idly mounted (e.g., idly mounted via bearings) to the shafts 116, 120, respectively when the clutches 114, 118 are disengaged. However, it will be understood that engagement of the clutch 114 enables mechanical power transfer between the gear 122 and the shaft 116. Similarly, engagement of the clutch 118 enables mechanical power transfer between the gear 124 and the shaft 120.

The first and second clutches 114 and 118 are positioned axially between the gears in the first and second gear reductions 128 and 132, respectively in the illustrated embodiment. In this way, the space efficiency of the gearbox is increased. However, other gearbox architectures have been contemplated.

Bearings 134 are coupled to opposing ends of the first shaft 116 and bearings 136 are coupled to opposing ends of the second shaft 120. A bearing as described herein may include inner races, outer races, and roller elements (e.g., balls, cylindrical rollers, tapered cylindrical rollers, and the like).

The multi-speed gearbox assembly 106 may be enclosed in a housing 138. The housing 138 may be configured to efficiently attach to the electric machine 104 and the axle housing 145. The axle housing 145 may at least partially enclose axle shafts 144. Further, the housing 138 is further configured to efficiently attach to an input unit that includes a gear reduction. In such an example, the input unit is rotationally coupled to the electric machine 104 and the shaft 116.

In the illustrated example, the gear 126 meshes with an input gear 142 of a differential 143. However, in an alternate example, the multi-speed gearbox assembly 106 may be configured to removably attach to a dropbox unit that includes a gear reduction with gears that mesh with the gear 126 and an input gear 142 of a differential 143 in an axle assembly 147. Consequently, the dropbox unit increases the axle's adaptability.

The differential 143 is rotationally coupled to the axle shafts 144 that are in turn designed to rotationally couple to drive wheels 173. The differential 143 may be an open differential, a limited slip differential, a locking differential, and the like. The axle assembly 147 may be removably attached to the multi-speed gearbox assembly 106. Both the axle assembly 147 and the multi-speed gearbox assembly 106 may function as modular units in the powertrain which increase the powertrain's adaptability.

The electric axle 102 may further include an axle housing 145 with hub assemblies 172 that include wheel mounts 174 which are coupled to the drive wheels 173. The axle housing 145 is removably coupled to the housing 138 to increase electric axle modularity.

The EV 100 further includes a control system 149 with a controller 150 as shown in FIG. 1. The controller 150 may include a microcomputer with components such as a processor 152 (e.g., a microprocessor unit), input/output ports, an electronic storage medium 154 for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed.

The controller 150 may receive various signals from sensors 156 coupled to various regions of the EV 100 and specifically the electric axle 102. For example, the sensors 156 may include a pedal position sensor designed to detect a depression of an operator-actuated pedal such as an accelerator pedal and/or a brake pedal, speed sensors at the input and/or output of the gearbox, an energy storage device state of charge (SOC) sensor, an inverter current sensor, clutch position sensors, and the like. Motor speed may be ascertained from the amount of power sent from the inverter to the electric machine. An input device 160 (e.g., accelerator pedal, brake pedal, drive mode selector, combinations thereof, and the like) may further provide input signals indicative of an operator's intent for vehicle control.

Upon receiving the signals from the various sensors 156 of FIG. 1, the controller 150 processes the received signals, and employs various actuators 158 of vehicle components to adjust the components based on the received signals and instructions stored on the memory of controller 150. For example, the controller 150 may receive an accelerator pedal signal indicative of an operator's request for increased vehicle acceleration. In response, the controller 150 may command operation of the inverter 110 to adjust electric machine power output and increase the power delivered from the electric machine 104 to the gearbox assembly 106. The controller 150 may, during certain operating conditions, be designed to send commands to the clutches 114, 118, to engage and disengage the clutches. For instance, a control command may be sent to the clutch 114 and in response to receiving the command, an actuator in the clutch may adjust the clutch based on the command for clutch engagement or disengagement. The other controllable components in the vehicle may function in a similar manner with regard to sensor signals, control commands, and actuator adjustment, for example.

An axis system is provided in FIG. 1 as well as FIGS. 2-13, for reference. The z-axis may be a vertical axis (e.g., parallel to a gravitational axis), the x-axis may be a lateral axis (e.g., horizontal axis), and/or the y-axis may be a longitudinal axis, in one example. The views of the electric axles shown in FIGS. 1-7 and 12-13 may therefore be top views. However, the axes may have other orientations, in other examples. Further, rotational axes 180, 181, 182, and 184 of the electric machine 104, the shaft 116, the shaft 120, and the differential 143, respectively are provided for reference.

Figure 12:
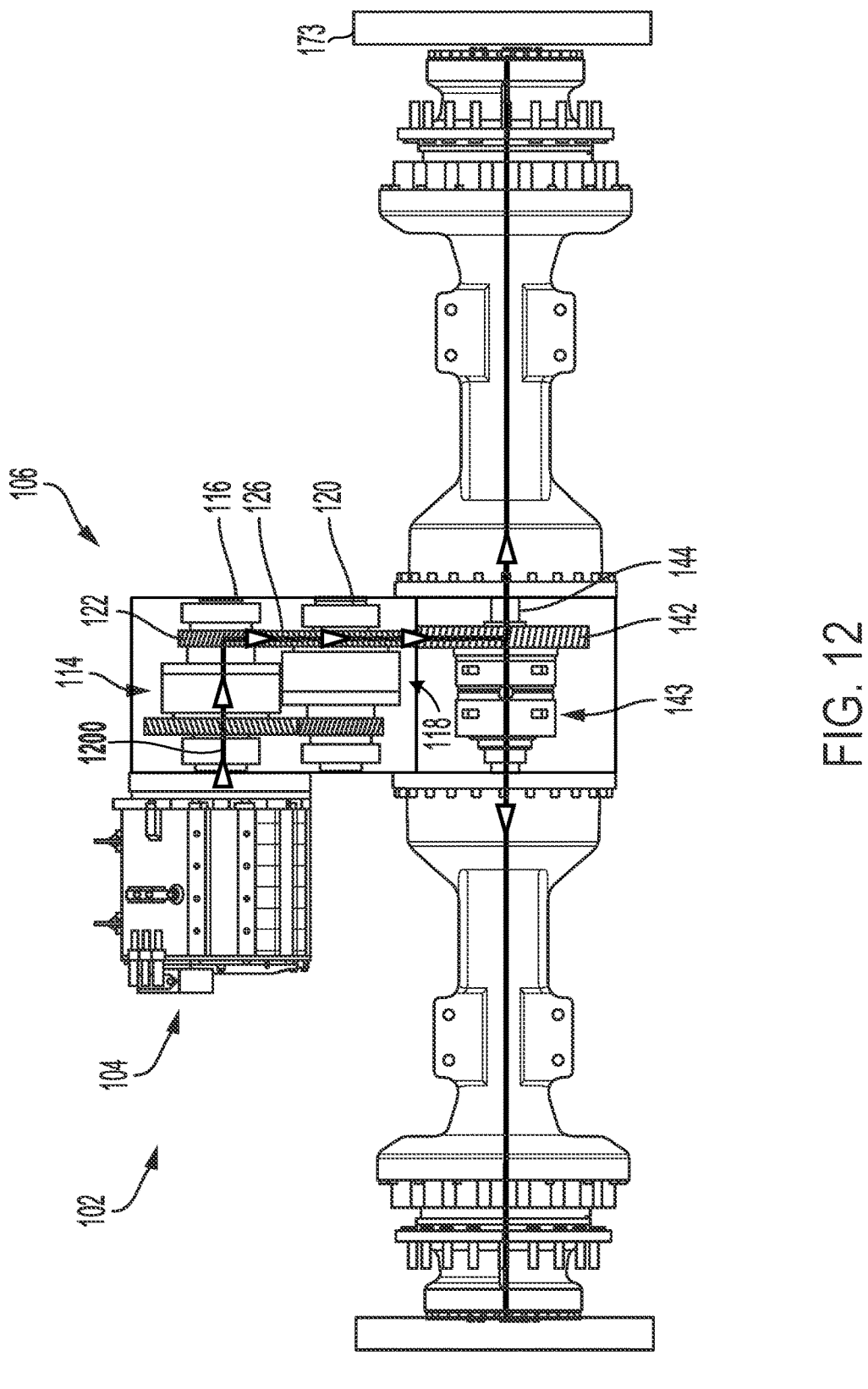
FIGS. 12-13 show mechanical power paths in different gear ratios in the electric axle, depicted in FIG. 1.
Figure 13:

FIGS. 12 and 13 show mechanical power paths 1200 and 1300, respectively, that occur in the multi-speed gearbox assembly 106 in different operating gear ratios. In FIG. 12 the clutch 114 is engaged and the clutch 118 is disengaged. Conversely, in FIG. 13 the clutch is disengaged and the clutch 118 is engaged. It will be understood that the power paths shown in FIGS. 12 and 13 correspond to drive operation of the electric axle. However, it will be understood that the power paths may be reversed during regeneration operation where the electric machine receives mechanical power from the gearbox and generates electrical energy.

Turning to FIG. 12, the mechanical power path 1200 unfolds as follows: mechanical power travels from the electric machine 104 to the shaft 116, from the shaft 116 to the gear 122 via the clutch 114, from the gear 122 to the gear 126, from the gear 126 to the differential 143 via gear 142, and from the differential 143 to drive wheels 173.

Turning to FIG. 13, the mechanical power path 1300 unfolds as follows: mechanical power travels from the electric machine 104 to the shaft 116, from the shaft 116 to the gear 130, from the gear 130 to the gear 124, from gear 124 to the shaft 120, from the shaft 120 to the clutch 118, from the clutch 118 to the gear 126, from the gear 126 to the differential 143 via the gear 142, and from the differential 143 to the drive wheels 173.

FIGS. 2-11 show different examples of electric axles with different architectures. However, it will be understood that these electric axles may have components that are similar to the components in the electric axle 102 depicted in FIG. 1. For instance, the multi-speed gearboxes in the axles shown in FIGS. 2-11 are similar in function and structure to the multi-speed gearbox assembly 106 depicted in FIG. 1 and therefore have similar numerical indicators.

Figure 2:
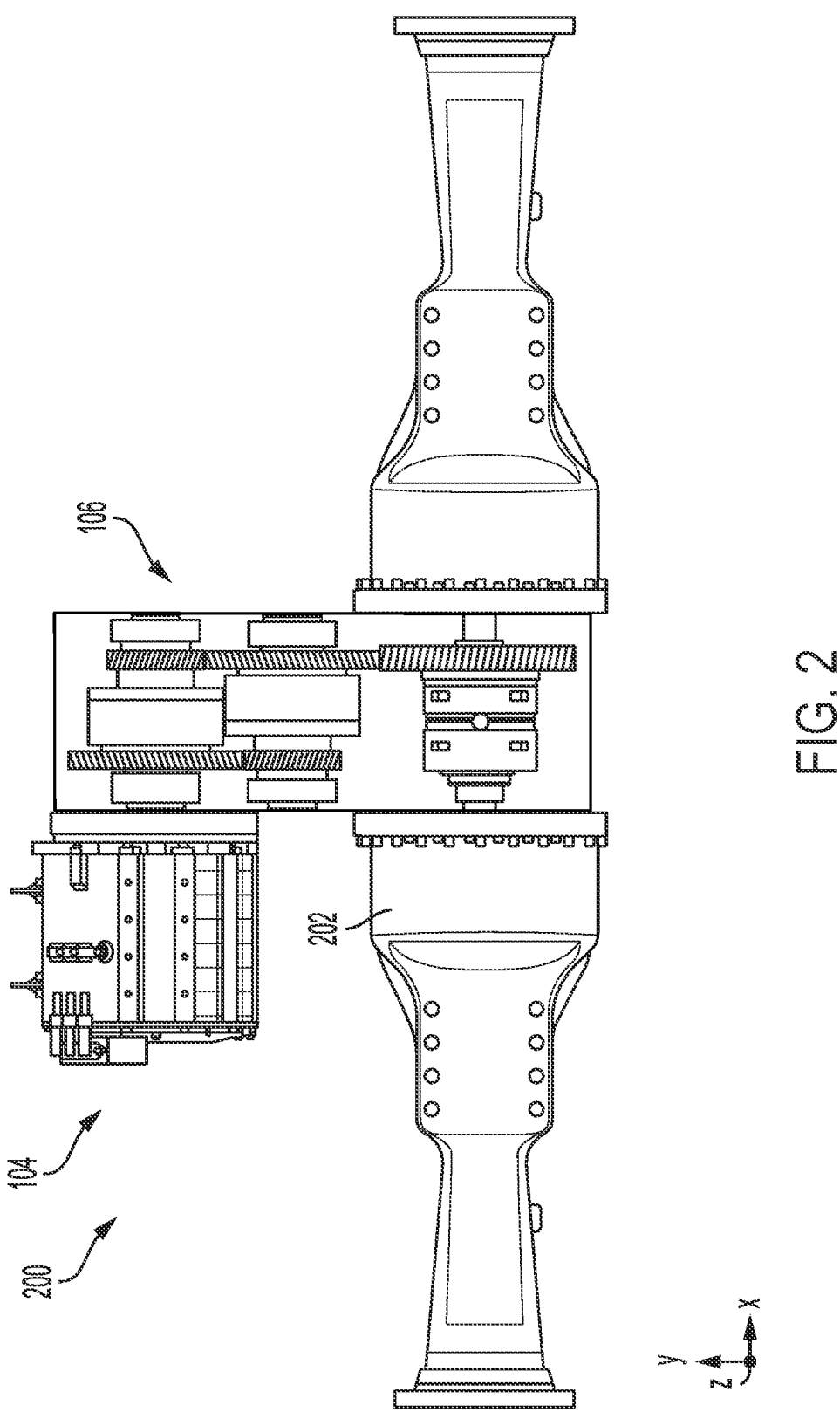
FIGS. 2-7 are top views of other examples of electric axles.

FIG. 2 shows another example of an electric axle 200 with the electric machine 104, and multi-speed gearbox assembly 106, similar to the axle shown in FIG. 1. However, the electric axle 200 depicted in FIG. 2 includes a different axle housing 202. In this way, the electric axle assembly can be adapted for use in a wide variety of vehicles.

Figure 3:
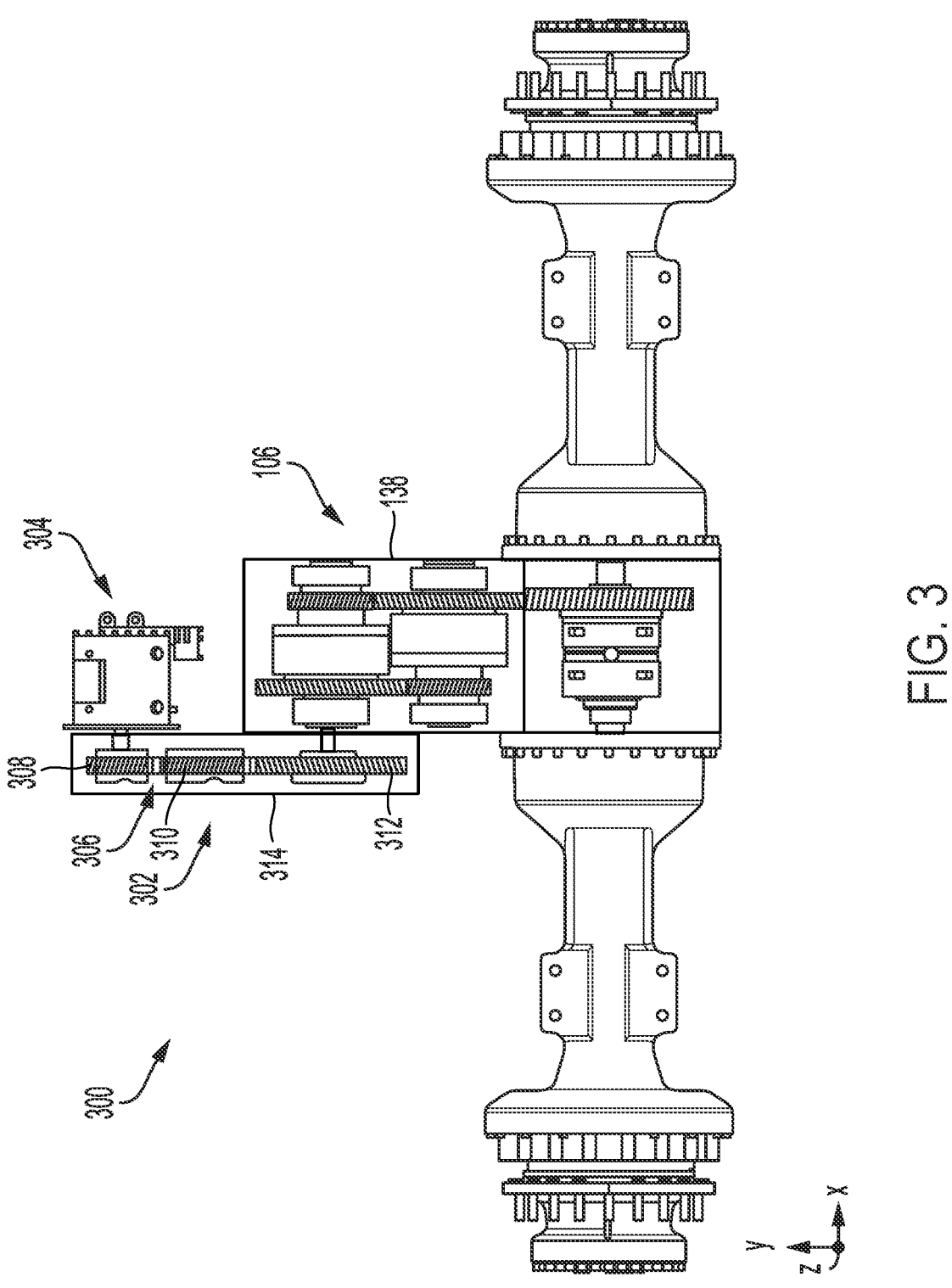

FIG. 3 shows another example of an electric axle 300. The electric axle 300 includes the multi-speed gearbox assembly 106. The electric axle 300 further includes an input unit 302 that is removably coupled to an electric machine 304 and the multi-speed gearbox assembly 106. The electric machine may have a smaller profile and higher operating speed range than the other motors described herein. The input unit 302 includes gear reductions 306. To elaborate, in the illustrated example, the input unit 302 includes gears 308, 310, and 312. The input unit 302 further includes a housing 314 that mounts (e.g., directly mounts) to the housing 138 of the multi-speed gearbox assembly 106. Further, the gear 308 is rotationally coupled to the electric machine 304. Additionally, the gears 308, 310, and 312 are mounted on shafts that may be fixed to the housing or other suitable component.

Figure 4:
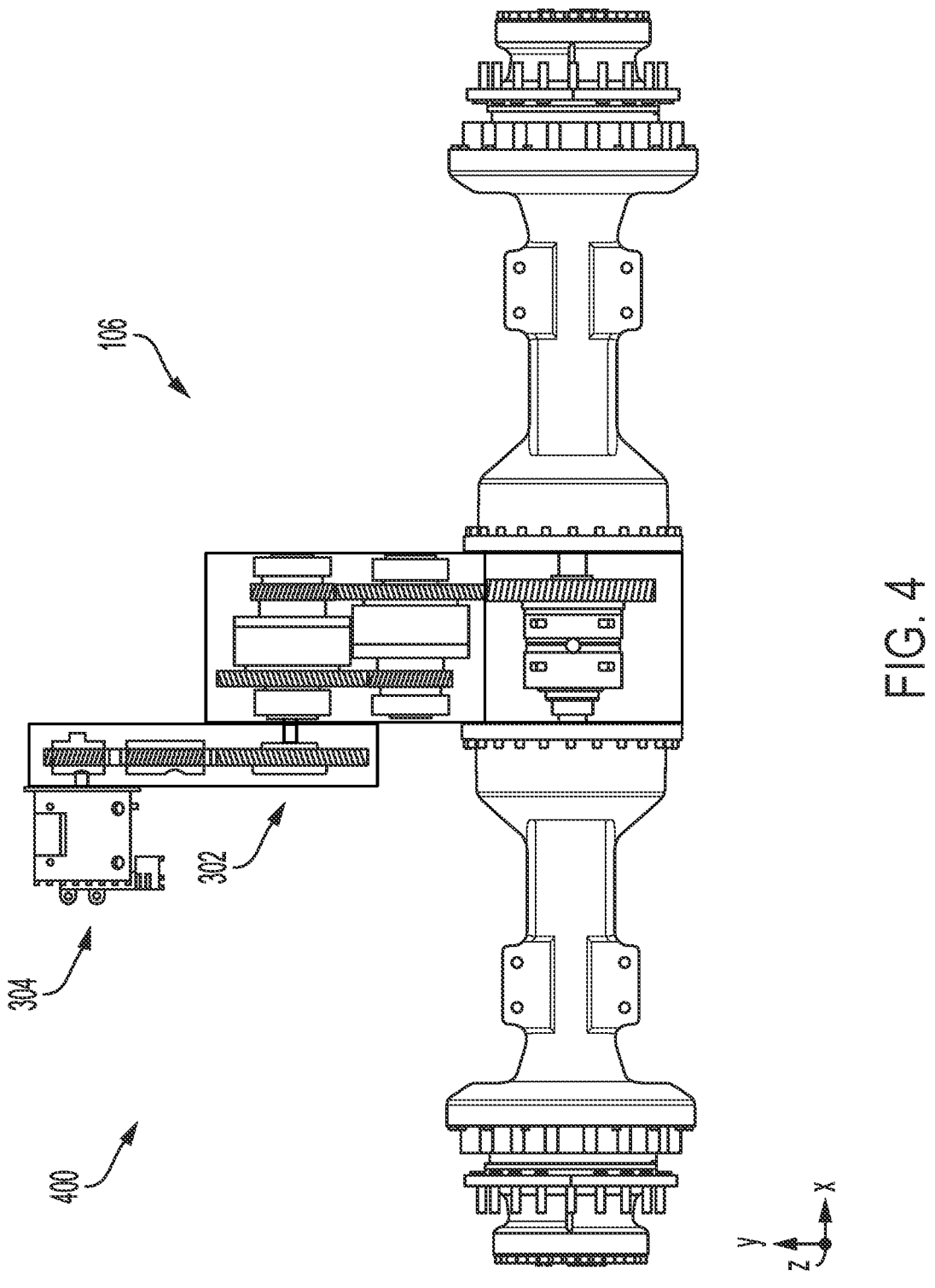
Figure 5:
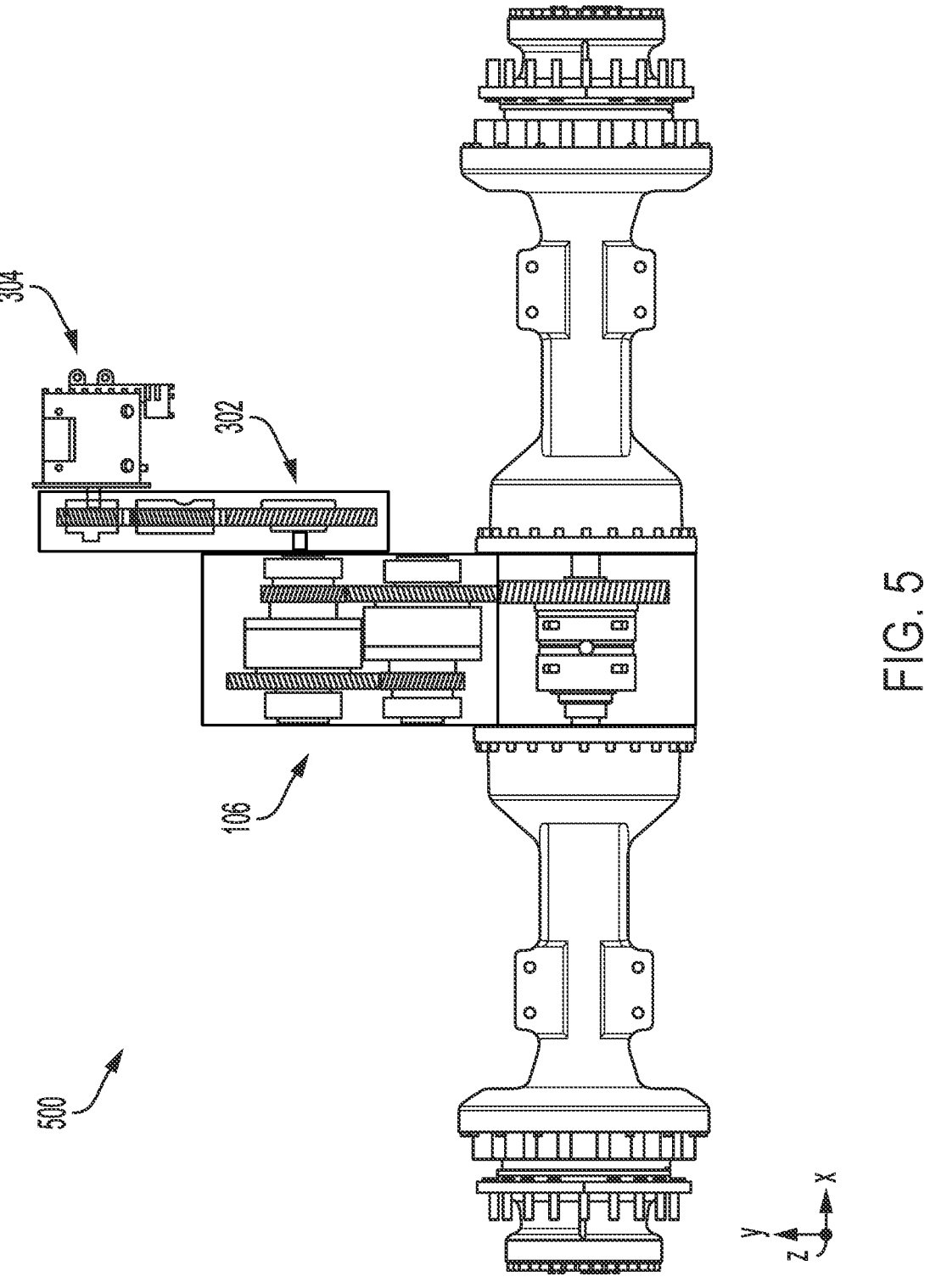

FIGS. 4 and 5 show other examples of electric axles 400 and 500, respectively. The electric axles 400, 500 each have the electric machine 304, the input unit 302 and the multi-speed gearbox assembly 106, similar to the electric axle shown in FIG. 3. However, the electric machine 304, depicted in FIG. 4 is positioned on the opposite side of the input unit 302 when compared to the electric axle 300 shown in FIG. 3. Further, as shown in FIG. 5, the input unit 302 and the electric machine 304 may be positioned on the opposite axial side of the multi-speed gearbox assembly 106 in comparison to the electric axle 300, depicted in FIG. 3.

Figure 6:
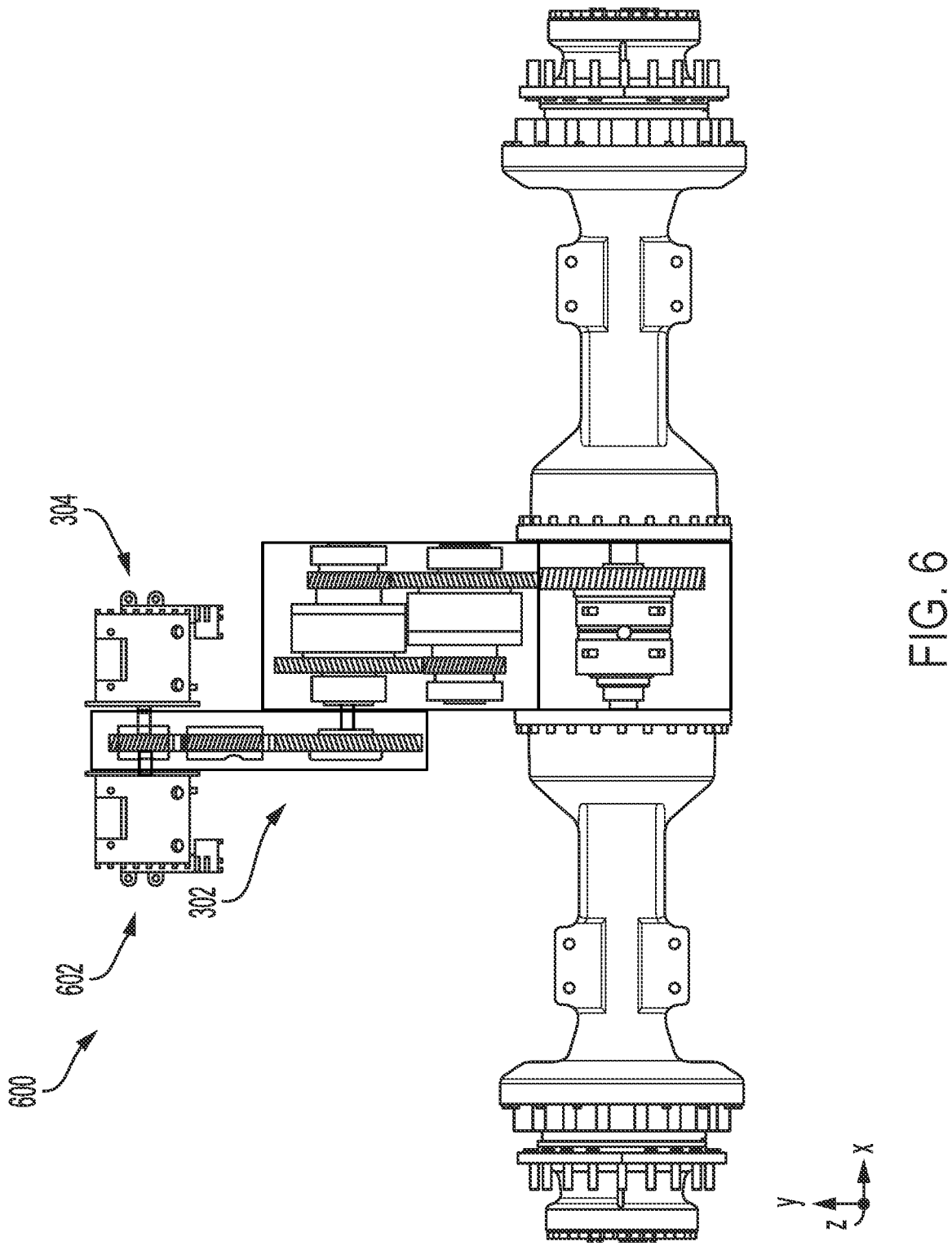

FIG. 6 shows an electric axle 600 similar to the electric axle shown in FIG. 3 except with a second electric machine 602 coupled to the input unit 302 on an opposing axial side of the input unit as the first electric machine 304.

Figure 7:
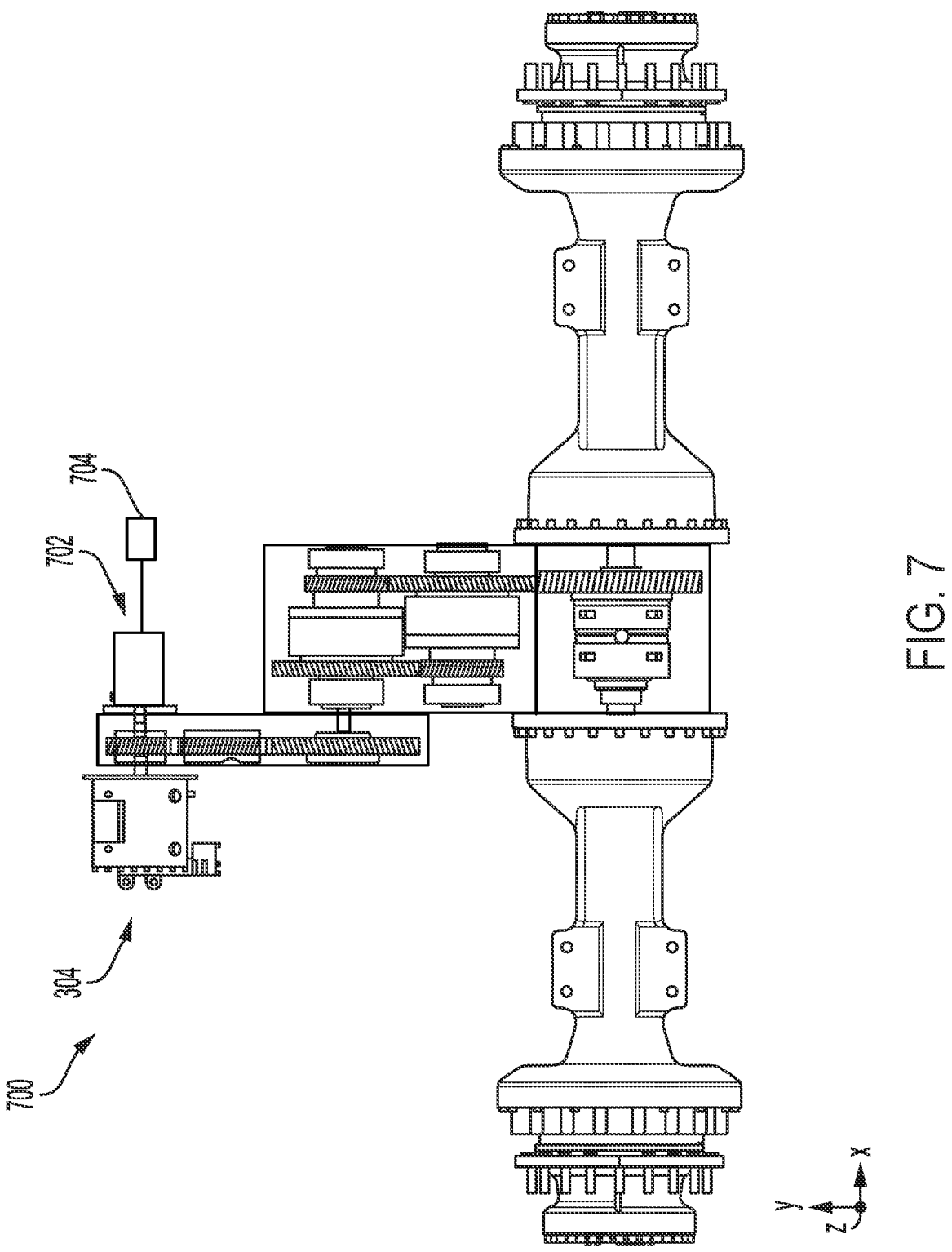

FIG. 7 shows an electric axle 700 similar to the electric axle shown in FIG. 3 except with a power take-off (PTO) 702 (e.g., a PTO hydraulic pump) coupled to the input unit 302 on an opposing side of the unit as the electric machine 304. The PTO 702 may be configured to provide pressurized fluid or torque to one or more implement(s) 704.

The electric axles depicted in FIGS. 1-7 identify variations that can be achieved through the modular units in the axles which allows the gear ratios, motor input speeds, and motor sizing to remain flexible and able to meet the end-use design goals of a variety of vehicle types, if so desired. Consequently, the electric axles may appeal to a wide variety of customers.

FIGS. 8-11 show side views of different exemplary electric axles with electric machines and gearboxes have different positions but with a similar orientation of a frame rail 800.

Figures 8, 9, 10:
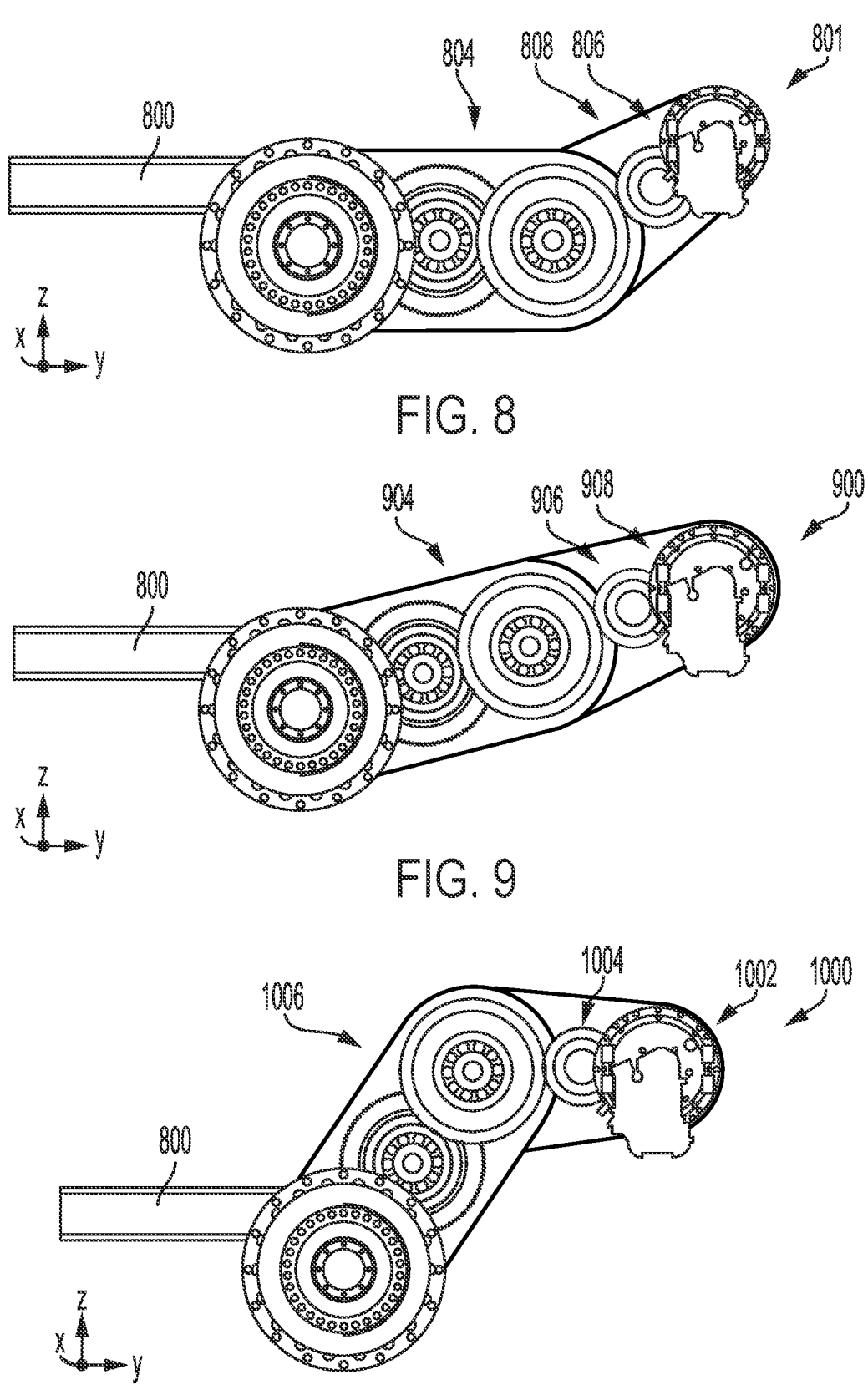
FIGS. 8-11 are side views of different examples of electric axles.

Turning specifically to FIG. 8 in which an electric axle 801 is shown a multi-speed gearbox 804 with rotational axes that have a similar position along the z-axis. However, an electric machine 806 and an input unit 808 have a higher position along the z-axis when compared to the other modular components in the axle.

Figure 11:
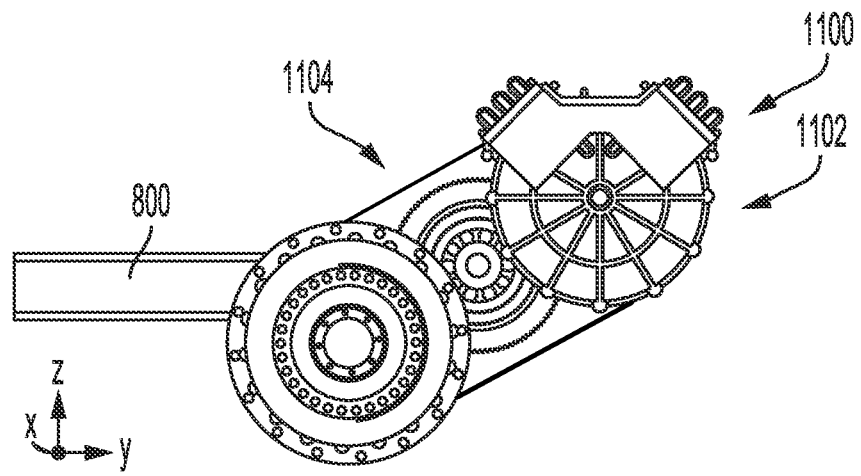

FIG. 9 shows an electric axle 900 with a multi-speed gearbox 904, an input unit 906, and an electric machine 908 having increasing vertical positions with regard to the z-axis. FIG. 10 shows an electric axle 1000 with an electric machine 1002 and an input unit 1004 have a similar position along the z-axis and positioned higher than a multi-speed gearbox 1006. In this manner, the electric axle's profile may be adapted to meet end use design goals while maintaining the frame rail 800 in a similar position, if desired. FIG. 11 shows an electric axle 1100 with an electric machine 1102 and a multi-speed gearbox 1104 having different vertical positions along the z-axis.

Two or more of the different electric axle architectures shown in FIGS. 1-13 may be included in an electric axle product line. In the product line, the multi-speed gearbox assembly may have an identical size, form, and function. In this way, the different electric axles share an identical gearbox which can increase manufacturing efficiency of the axles in the product line. However, the other units (e.g., the input unit, the electric machines, and/or the PTO) in each of the electric axles in the product may vary between axles in the product line. For instance, a first electric axle in the product line may have a larger motor than a second electric axle in the product line. Further, in another example, a first electric axle in the product line may have an input unit with a gear reduction and a second electric axle in the product line. In this way, the electric axles may be effectively adapted to meet end-use design targets of different vehicle platforms, thereby expanding the product line's appeal. Further, the numbers associated with components (i.e., a first component, a second component, and so one) described herein does not denote any sort of rank but rather denotes the order that the components have been introduced. As such, the components may be described using different numbering without departing from the scope of the disclosure.

FIGS. 1-13 provide for a method for operation of the gearbox assembly where the first clutch is engaged and the second clutch is disengaged and vice versa to alter the gear ratio of the gearbox. To elaborate, the gearbox assembly may be operated to powershift between gear ratios. During the powershift one clutch is transitioned into engagement while the other clutch is being disengaged. In this way, the clutches may be slipped during shifting transients to enable smooth shifting operation to be implemented, thereby decreasing noise, vibration, and harshness (NVH) during shifting.

FIGS. 1-13 are drawn approximately to scale, aside from the schematically depicted components. However, the electric axles may have other relative components dimensions in alternate embodiments.

FIGS. 1-13 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an electric axle is provided that comprises a multi-speed gearbox assembly rotationally coupled to a first electric machine and including; a first shaft with a first clutch positioned coaxial thereto; and a second shaft with a second clutch positioned coaxial thereto; and a dropbox unit removably attached to the multi-speed gearbox assembly and including a gear meshing with a gear on the second shaft; wherein the first clutch and the second clutch are designed to shift between a first gear reduction and a second gear reduction with a plurality of gears positioned coaxial to the first shaft and the second shaft; and wherein the first and second clutches are positioned axially between the first and second gear reductions.

In another aspect, an electric axle product line is provided that comprises a first electric axle assembly including: a first electric machine coupled to a first multi-speed gearbox assembly; a second electric axle assembly including: a second electric machine coupled to a second multi-speed gearbox assembly; and a first input unit that includes a gear reduction rotationally coupled to the second electric machine and a gear in the second multi-speed gearbox assembly; wherein the first and second multi-speed gearbox assemblies have an identical profile.

In another aspect, an electric axle is provided that comprises a multi-speed gearbox assembly rotationally coupled to a first electric machine and including; a first shaft with a first clutch positioned coaxial thereto; and a second shaft with a second clutch positioned coaxial thereto; and wherein the first clutch and the second clutch are configured to adjust a gear ratio of the multi-speed gearbox assembly; and wherein the first shaft and the second shaft are parallel to one another.

In another aspect, an electric axle product line is provided that comprises a first electric axle assembly including: a first electric machine coupled to a first multi-speed gearbox assembly; a second electric axle assembly including: a second electric machine coupled to a second multi-speed gearbox assembly; and a first input unit that includes a gear reduction rotationally coupled to the second electric machine and a gear in the second multi-speed gearbox assembly; wherein the first and second multi-speed gearbox assemblies have an identical profile.

In another example, an electric axle is provided that comprises a multi-speed gearbox assembly configured to directly rotationally couple to a first electric machine in a first configuration and rotationally coupled to an input unit in a second configuration; wherein the multi-speed gearbox assembly comprises: a first shaft with a first clutch positioned coaxial thereto; and a second shaft with a second clutch positioned coaxial thereto; and wherein the first clutch and the second clutch are configured to shift the multi-speed gearbox assembly between a first gear ratio and a second gear ratio; and wherein the first shaft and the second shaft are parallel to one another.

In any of the aspects or combinations of the aspects, the first clutch may be positioned axially between two gears that are coaxial to the first shaft and the second clutch may be positioned axially between two gears that are coaxial to the second shaft.

In any of the aspects or combinations of the aspects, the multi-speed gearbox assembly may include a differential that is configured to rotationally couple to drive wheels.

In any of the aspects or combinations of the aspects, the electric axle may be an electric beam axle configured to couple to a dependent suspension system.

In any of the aspects or combinations of the aspects, the multi-speed gearbox assembly may be directly mounted to an axle shaft housing.

In any of the aspects or combinations of the aspects, the input unit may be configured to rotationally couple to a second electric machine.

In any of the aspects or combinations of the aspects, the input unit may be configured to rotationally couple to a power-take off (PTO) pump.

In any of the aspects or combinations of the aspects, the electric axle may further comprise a second input unit that is removably coupled to the multi-speed gearbox assembly and includes a gear reduction rotationally coupled to the first electric machine and a gear in one of the first and second gear reductions that is fixedly coupled to the first shaft.

In any of the aspects or combinations of the aspects, the first clutch may be designed to selectively rotationally couple a gear in the first gear reduction to the second shaft and wherein the second clutch is designed to selectively rotationally coupled a gear in the second gear reduction to the first shaft.

In any of the aspects or combinations of the aspects, the first clutch and the second clutch may be friction clutches.

In any of the aspects or combinations of the aspects, the electric axle may be an electric beam axle.

In any of the aspects or combinations of the aspects, the first electric axle assembly may further comprise a first input unit that includes a gear reduction rotationally coupled to the first electric machine and a gear in the first multi-speed gearbox assembly.

In any of the aspects or combinations of the aspects, the first electric machine may have a different size than the second electric machine.

In any of the aspects or combinations of the aspects, the second electric axle assembly may further include a power take-off (PTO) unit removably coupled to the first electric machine.

In any of the aspects or combinations of the aspects, the second electric axle assembly may further include a third electric machine coupled to input unit.

In another representation, an electric drive axle for an electric vehicle is provided that comprises a modular shiftable gearbox with two clutches that are parallel to one another and configured to powershift between two operating gear ratios, wherein the modular shiftable gearbox is configured to directly attach to an input gear reduction and a traction motor in different configurations and is configured to directly attach to an axle shaft housing.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation nor restriction. It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and/or internal combustion engines. The subject matter of the present disclosure includes all novel and non-obvious combinations and sub-combinations of the various systems and configurations, and other features, functions, and/or properties disclosed herein. It will be apparent to persons skilled in the relevant arts that the disclosed subject matter may be embodied in other specific forms without departing from the spirit of the subject matter.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the term "approximately" is construed to mean plus or minus five percent of the range, unless otherwise specified.

The invention claimed is:

1. An electric axle comprising:
   a multi-speed gearbox assembly rotationally coupled to a first electric machine and including;
      a first shaft with a first clutch positioned coaxial thereto; and
      a second shaft with a second clutch positioned coaxial thereto;
   wherein the first clutch and the second clutch are configured to adjust a gear ratio of the multi-speed gearbox assembly; and
   wherein the first shaft and the second shaft are parallel to one another.

2. The electric axle of claim 1, further comprising an input unit that is removably coupled to:

the multi-speed gearbox assembly and includes a gear reduction rotationally coupled to the first electric machine and a gear in the multi-speed gearbox assembly.

3. The electric axle of claim 2, further comprising a power take-off (PTO) rotationally coupled to the input unit.

4. The electric axle of claim 3, wherein the PTO and the first electric machine are coaxially positioned.

5. The electric axle of claim 2, further comprising a second electric machine rotationally coupled to the input unit.

6. The electric axle of claim 1, wherein the first clutch is designed to selectively rotationally couple a first gear to the first shaft and wherein the second clutch is designed to selectively rotationally coupled a second gear to the second shaft.

7. The electric axle of claim 1, wherein the first clutch and the second clutch are friction clutches.

8. The electric axle of claim 1, wherein the electric axle is an electric beam axle.

9. The electric axle of claim 1, wherein the first clutch is positioned axially between two gears that are coaxial to the first shaft and the second clutch is positioned axially between two gears that are coaxial to the second shaft.

10. The electric axle of claim 1, wherein the multi-speed gearbox assembly includes a differential that is configured to rotationally couple to drive wheels.

11. An electric axle comprising:
   a multi-speed gearbox assembly configured to directly rotationally couple to a first electric machine in a first configuration and rotationally coupled to an input unit in a second configuration;
   wherein the multi-speed gearbox assembly comprises:
      a first shaft with a first clutch positioned coaxial thereto; and
      a second shaft with a second clutch positioned coaxial thereto;
   wherein the first clutch and the second clutch are configured to shift the multi-speed gearbox assembly between a first gear ratio and a second gear ratio; and
   wherein the first shaft and the second shaft are parallel to one another.

12. The electric axle of claim 11, wherein the electric axle is an electric beam axle configured to couple to a dependent suspension system.

13. The electric axle of claim 11, wherein the multi-speed gearbox assembly is directly mounted to an axle shaft housing.

14. The electric axle of claim 11, wherein the input unit is configured to rotationally couple to a second electric machine.

15. The electric axle of claim 11, wherein the input unit is configured to rotationally couple to a power-take off (PTO) pump.

* * * * *